May 25, 1926. 1,586,233

H. ANSCHUTZ-KAEMPFE

MEANS FOR CONTROLLING ROTATING FIELD MOTORS

Filed March 19, 1925

*Inventor:*
Hermann Anschütz-Kaempfe
By
Pennie, Davis, Marvin & Edmonds
*Attorneys*

Patented May 25, 1926.

1,586,233

UNITED STATES PATENT OFFICE.

HERMANN ANSCHUTZ-KAEMPFE, OF MUNICH, GERMANY, ASSIGNOR TO NEDER-LANDSCHE TECHNISCHE HANDEL MAATSCHAPPIJ "GIRO," OF S'GRAVENHAGE, NETHERLANDS.

MEANS FOR CONTROLLING ROTATING FIELD MOTORS.

Application filed March 19, 1925. Serial No. 16,722.

This invention relates to means for the control of rotating field motors by slight variations in resistance, inductance or capacity, the direction of rotation and the speed of the motor depending on the sign and amount of the variation of the said conducting elements. According to this invention this problem is solved by causing the alternating currents of small magnitude produced by variations in resistance, inductance or capacity, to act on the in-put circuit of an amplifier unit, one or more phase windings of the rotating field motor to be controlled, being made dependent on the out-put circuit of the said unit. Provision is made whereby the phase of these alternating currents depends on the sign of the variation of the resistance, inductance or capacity; and provision is further made for enabling the amplifier connection to be adapted within the widest possible limits to the special conditions of the motor to be controlled.

Figure 1:
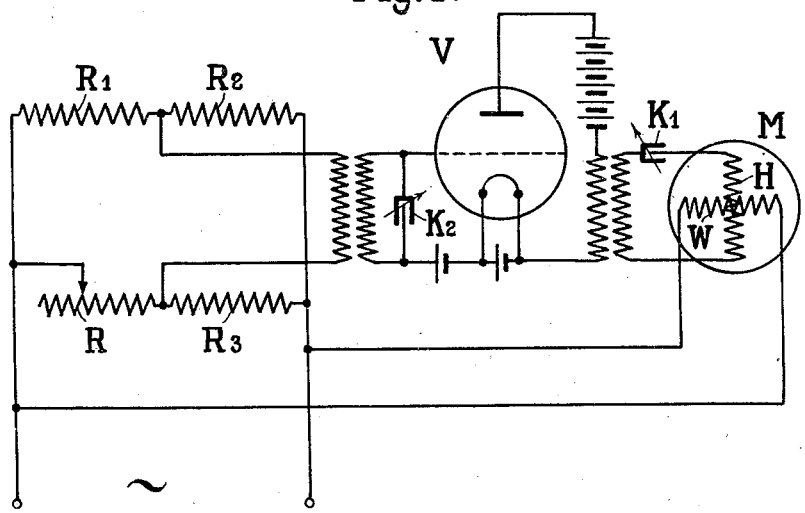
Figure 2:
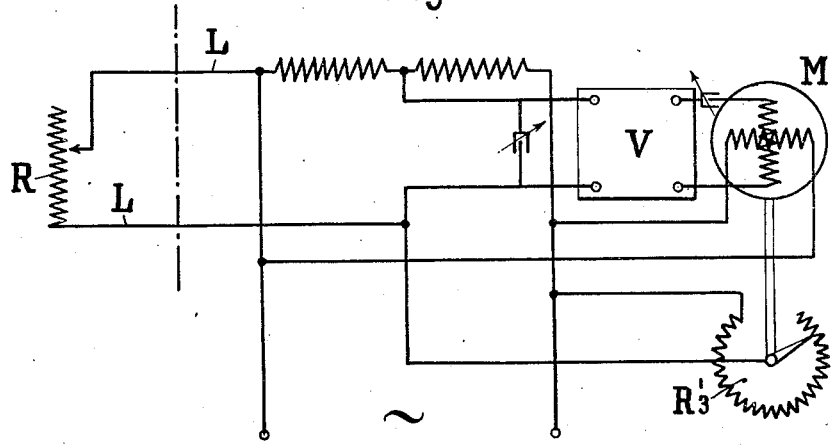

Figure 1 shows diagrammatically one embodiment of my invention,

Figure 2 a diagrammatic view of a construction according to the invention for distance control and distance transmission for signalling purposes.

In Figure 1, the arrangement is based on the use of resistance elements; the arrangement for inductive elements or for capacity units would be a corresponding one. The expression "conducting elements" is used herein to designate generally either resistance elements, inductive elements or capacity units. Moreover for the sake of simplicity the motor to be controlled has been assumed to be a two-phase motor. There is however no difficulty in applying the principles of the invention also to polyphase motors. Furthermore, while a single stage amplifying unit has been shown at V in Figure 1, yet of course a combination of several stages may be used in its place, according to the special conditions.

The variable resistance R is connected to other resistances $R^1$, $R^2$, $R^3$ to form a bridge arrangement, and this bridge is connected to a source of alternating current. The equalizing conductor or balancing connection of the bridge forms the in-put circuit of an amplifier unit V. The amplifier unit illustrated in Figure 1 comprises a three-element vacuum tube. In the out-put circuit of the amplifier unit is inserted one of the two windings of the two-phase motor M, which will be here described as secondary winding H. The main winding W of the motor is connected to the same alternating voltage as the bridge arrangement. If the variable resistance R is set in such a manner that the bridge is in equilibrium, that is to say so that the equalizing conductor carries no current, no current will flow in the auxiliary winding H of the motor M for there is no alternating current flowing in the in-put circuit of the amplifying unit. The motor will therefore not operate for there is no rotating field.

When the resistance R is varied, an alternating current voltage of small magnitude will be impressed on the equalizing conductor of the bridge that is to say on the in-put circuit of the amplifier, and the said voltage will be in phase or in phase opposition with the voltage of the bridge, according to the direction of the variation. The amplified current which flows in the auxiliary winding of the motor, will then produce a corresponding field. Provision is further made, in a manner more fully described hereinafter, whereby the said auxiliary current or auxiliary field will have a phase displacement or difference of 90° relatively to the main current or main field, so that the said fields form together a rotating field of sufficient magnitude to start the motor. It will depend on the phase direction of the alternating current voltage at the in-put side of the amplifier whether the auxiliary field will be displaced 90° relatively to the main field in the forward or in the backward direction, or in other words, the direction of rotation of the rotating field will depend on the sign of the variation of the resistance R.

In order to make the auxiliary field as strong as possible, a suitable variable condenser $K^1$ can be inserted in the circuit, including the auxiliary winding H, or in other words, this circuit can be tuned to resonance by means of such a condenser. For tuning the system to the most favourable value of phase difference between the auxiliary field and the main field, a second variable condenser K² can be used in the in-put circuit of the amplifier.

By means of this invention the slightest variations of a resistance, inductance or capacity, can, owing to the use of an amplifier unit, be utilized in starting the motor in one or in the other direction, without employing any contacts for the purpose.

A construction of a distance control and distance transmission according to the invention, is diagrammatically illustrated in Figure 2. A variable resistance R of any desired construction; is used as a transmitter, and, together with the distance line L, it forms a branch of a Wheatstone bridge, the equalizing conductor of which forms the input of the amplifier unit V. The connections for the amplifier and the motor correspond exactly to that already described. The only difference from the arrangement shown in Figure 1 is the object for which the motor M is used. It is coupled here to other parts acting as a receiver, for instance to an adjustable resistance R'₃ of the bridge, in such a manner that when the transmitter is moved, these parts are brought into such a position that the equilibrium condition of the system is re-established. As in such an arrangement, a given receiver position corresponds to each transmitter position, the installation can be used for signalling purposes and the like.

By employing the amplifier according to the invention, it is possible to start the motor by as small disturbances of the bridge equilibrium as desired, and thus to obtain a very sensitive control of the motor or a very exact distance setting.

What I claim is:—

1. A system of the type described, comprising the combination with a dynamo electric machine having two windings, of an amplifying unit having the out-put side thereof connected to one of said windings, a plurality of conducting elements, and a source of alternating current connected to said elements and to the other winding, said elements being connected to the in-put side of said amplifying unit in such a manner that a small variation in the impedance of one of said elements produces a relatively large variation in the current supplied by said amplifying unit.

2. A system of the type described, comprising the combination with a dynamo electric machine having two windings, of an amplifier unit having the output side thereof connected to one of said windings, a plurality of conducting elements arranged to form a Wheatstone's bridge, a source of alternating current connected to the other winding and to said bridge, and a balancing connection for said bridge, connected to the input side of said amplifier unit.

3. A system of the type described, comprising the combination with a dynamo electric machine having two windings, of an amplifier unit having the output side thereof connected to one of said windings, a plurality of conducting elements arranged to form a Wheatstone's bridge, a source of alternating current connected to the other winding and to said bridge, a balancing connection for said bridge, connected to the input side of said amplifier unit, and means for varying the phase relation of the output current of the amplifying unit with respect to the current from said source.

4. A system of the type described, comprising the combination with a dynamo electric machine having a winding, of an amplifying unit having the output side thereof connected to said winding, a plurality of conducting elements, a source of alternating current connected to said elements, said elements being connected to the said input side of said input unit, whereby a small variation in the impedance of one of said elements produces a relatively large variation in the current supplied to said motor winding, and means for tuning the output circuit of the amplifier unit.

5. A system of the type described, comprising the combination with a dynamo electric machine having two windings, of an amplifier unit having the output side thereof connected to one of said windings, a plurality of conducting elements arranged to form a Wheatstone's bridge, a source of alternating current connected to the other winding and to said bridge, a balancing connection for said bridge, connected to the input side of said amplifier unit, and means for varying the impedance of at least one of said conducting elements.

6. A system of the type described, comprising the combination with a dynamo electric machine having two windings, of an amplifier unit having a grid circuit and having the output side of the unit connected to one of said windings, a plurality of conducting elements arranged to form a Wheatstone's bridge, a source of alternating current connected to the other winding and to said bridge, a balancing connection for said bridge connected to the grid circuit of said amplifier unit, and means for varying the phase relation of the input current of the amplifier unit with respect to the current from said source, comprising a variable condenser connected in the grid circuit of said amplifier unit.

7. A system of the type described, comprising the combination with an electric motor having two windings, of an amplifier unit having the output side thereof connected to one of said windings, a plurality of conducting elements arranged to form a Wheatstone's bridge, a source of alternating current connected to the other motor winding and to said bridge, a balancing connection for said bridge connected to the input side of said amplifier unit, means for varying the impedance of one element of said bridge to cause current of a predetermined phase relation with respect to the current from said source to flow in the balancing connection, and means controlled by said motor for varying the impedance of another element of said bridge so as to stop the flow of current through said balancing connection.

In testimony whereof I have affixed my signature.

Dr. HERMANN ANSCHUTZ-KAEMPFE.